United States Patent [19]

Pleasant

[11] Patent Number: 4,959,002

[45] Date of Patent: Sep. 25, 1990

[54] INSERTS FOR INJECTION MOLD MACHINE

[76] Inventor: Ronald E. Pleasant, 665 N. Detroit Street, Kenton, Ohio 43326

[21] Appl. No.: 348,714

[22] Filed: May 8, 1989

Related U.S. Application Data

[62] Division of Ser. No. 89,274, Aug. 25, 1987, Pat. No. 4,828,479.

[51] Int. Cl.⁵ .............................................. B29C 45/40
[52] U.S. Cl. ................................ 425/192 R; 425/444; 425/556
[58] Field of Search ............... 425/552, 547, 182, 185, 425/190, 192 R, 554, 556, 557, 444

[56] References Cited

U.S. PATENT DOCUMENTS

| | | | |
|---|---|---|---|
| 793,895 | 7/1905 | Monroe | 425/378.1 |
| 2,554,378 | 5/1951 | Nichols | 425/190 |
| 2,564,615 | 8/1951 | Tallberg | 425/450.1 |
| 2,587,070 | 2/1952 | Spillman | 249/68 |
| 2,733,479 | 2/1956 | English | 249/68 |
| 3,044,121 | 7/1962 | Wiskoff et al. | 249/68 |
| 3,103,705 | 9/1963 | Letica | 249/68 |
| 3,113,346 | 12/1963 | Bright | 425/569 |
| 3,134,142 | 5/1964 | Canner | 249/68 |
| 3,161,918 | 12/1964 | Zearbaugh | 425/556 |
| 3,466,922 | 9/1969 | Phillips, Jr. | 72/467 |
| 3,645,492 | 2/1972 | Edlis | 425/556 |
| 3,737,268 | 6/1973 | Ryder | 425/444 |
| 3,986,805 | 10/1976 | Haines | 425/450.1 |
| 4,202,522 | 5/1980 | Hanas et al. | 425/192 R |
| 4,364,720 | 12/1982 | Ryder | 425/595 |
| 4,556,377 | 12/1985 | Brown | 249/68 |
| 4,622,001 | 11/1986 | Bright et al. | 425/532 |
| 4,655,275 | 4/1987 | Worner | 425/190 |

Primary Examiner—Jay H. Woo
Assistant Examiner—Timothy W. Heitbrink
Attorney, Agent, or Firm—Roger S. Dybvig

[57] ABSTRACT

A cavity insert for the injection side and a core insert for the ejection side of a mold are each shaped as a generally cylindrical, stepped body provided with circumferentially extending locking grooves and a liquid cooling or heating channel. Insert retainers and lifters having rotatable elements with locking tongues engaging the locking grooves clamp the inserts in the main mold frame. The main mold frame is provided with liquid conduits opening to opposite ends of the liquid channels so that the need for machining liquid conduits and channels for different inserts is avoided. Ejector tooling may be connected to the core insert for insertion and removal with it. The rotatable elements also have shoulders engageable with the inserts and may be axially moved to lift the inserts partly out of the mold frame to enable rapid changeover from one insert to another. Sliding wedges are used to releasably secure the ejector tooling to the master mold ejector plates. Improved ejector return pin assemblies may be used to enable the use of oversized inserts. A guided ejector system may be used as part of the main mold frame.

15 Claims, 3 Drawing Sheets

INSERTS FOR INJECTION MOLD MACHINE

This is a division of copending application Ser. No. 07/089,274, filed Aug. 25, 1987, now U.S. Pat. No. 4,828,479, granted May 9, 1989.

SUMMARY OF THE INVENTION

This invention relates to improvements in molding apparatus and particularly injection molding apparatus of the type used for molding plastic workpieces. However, this invention may be used for other types of molding such as die casting.

Molds with removable inserts for mold frames are in use and are especially valuable for prototype or low production molding needs wherein the tooling is changed after relatively short runs. However, the known molds of this type still require substantial changeover time and the need exists for an inexpensive mold system requiring minimal changeover time and machining operations.

An object of this invention is to provide improved quick-changeover cavity inserts for the injection side of mold tooling and similar quick-changeover core inserts for the ejection side. Each insert comprises a generally cylindrical, stepped body provided with a pair of circumferentially extending clamping grooves and a circumferentially extending liquid cooling or heating channel. Insert retainers and lifters are provided having rotatable elements with locking tongues engageable with the locking grooves. The rotatable elements are confined for axial movement upon clamp screws so that, with the locking tongues engaged within the clamping grooves, the clamp screws may be tightened to the master mold to draw and clamp the inserts thereto.

The rotatable elements also have shoulders which may be positioned in engagement with the inserts for lifting the inserts from the mold frame by unscrewing the clamp screws to enable rapid and safe removal of the inserts. Further, the main mold frame is provided with liquid connections opening to opposite ends of the liquid channels of the inserts to provide for uniform cooling or heating of the inserts so that the need for machining liquid conduits and channels for different inserts is avoided. Ejector tooling may be connected to the core insert for insertion and removal with it. Sliding wedges are used to releasably lock the ejector tooling in place.

Further in accordance with this invention, the sprue bushing plate is so connected to the master mold frame that it may be removed from the injection side by first removing the cavity insert to provide access to the screws that hold the sprue bushing plate, and then taking the bushing plate out through the face of the injection side tooling "A" plate. Thus, removal of the injection side of the master mold from the molding machine is not needed. Accordingly, much time may be saved when changing sprue bushing types, such as to extended nozzle bushing plates, or when changing, for example, to hot sprue bushings or to runnerless manifolds.

Another object of this invention is to provide improved ejection return pin assemblies which enable the use of oversized inserts which are not flush with the "A" plate and the "B" plate. The return pin assemblies include spring discs or washers which cause the return pins to extend beyond the face of the "B" plate so that they will nonetheless be engaged by the face of the "A" plate if the inserts are slightly oversized. In a modification, the face ends of the return pins have tapped holes and extension members are provided which may be secured by screws engaged in the tapped holes to accommodate even greater thicknesses of the inserts.

Other objects and advantages will become apparent from the following description and the drawings.

BRIEF DESCRIPTION OF THE DRAWINGS

FIG. 11 is a cross-sectional view of the ejection side analogous to FIG. 4. FIG. 11 also shows, by phantom lines, the outline of the injection side in operative relation to the ejection side. Some parts out of the plane of the section are not illustrated in FIG. 11 to avoid a confusion of lines.

DETAILED DESCRIPTION

As used in this description and the claims that follow, the term "cavity insert" refers to the insert which is on the injection side of a master mold and is clamped in fixed relation to the "A" pate and the term "core insert" refers to the insert on the ejection side of the master mold and is clamped in fixed relation to the "B" plate. These definitions are believed to be conventional and well understood in the industry. The cavity insert and the core insert are machined with cavities, cores, or flat faces as required by the configuration of the piecepart to be produced in the mold chamber formed by the cavity and core inserts. They may also be provided with multiple cavities or cores for producing more than one piecepart at a time.

Figure 1:
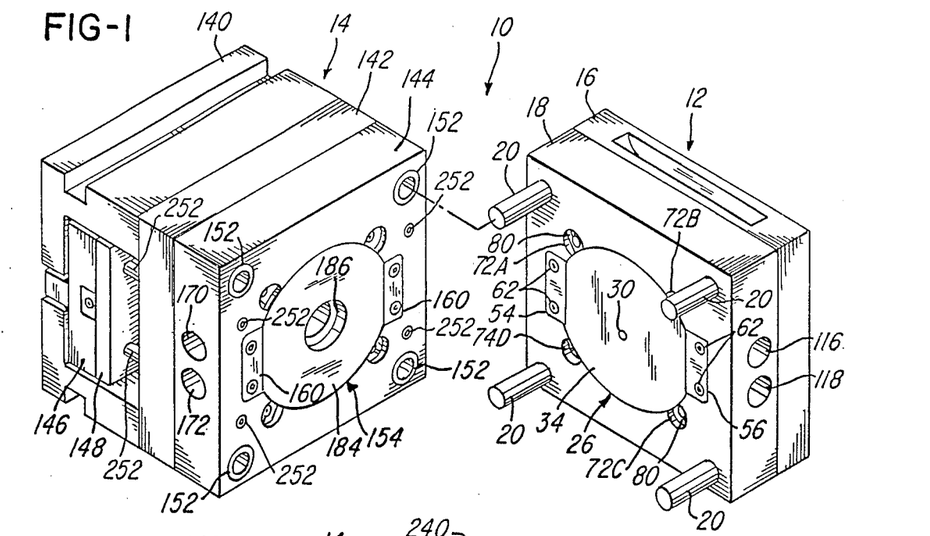
FIG. 1 is a partially-exploded perspective view of injection and ejection sides of a master mold made in accordance with this invention.
Figure 2:
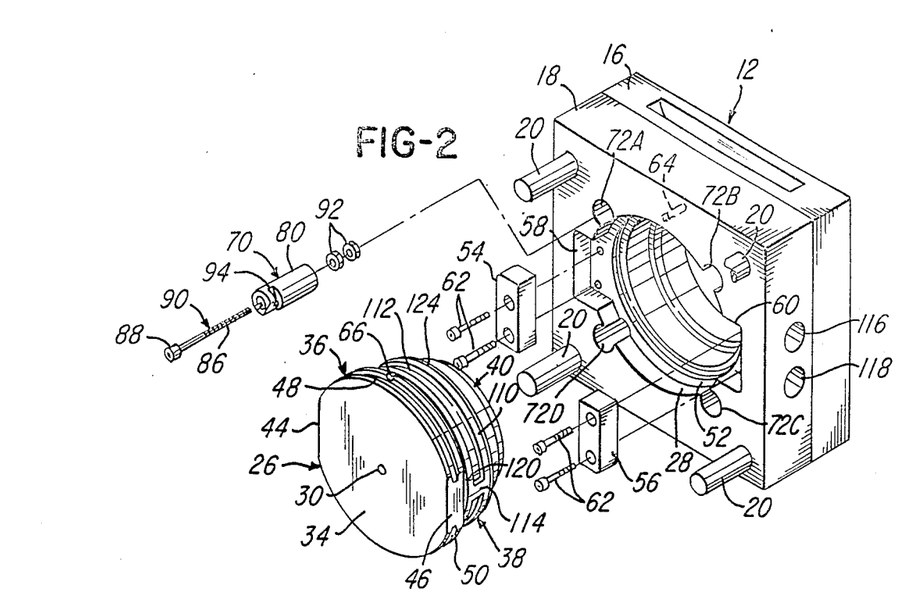
FIG. 2 is a partially-exploded perspective view of the injection side of FIG. 1.
Figure 11:
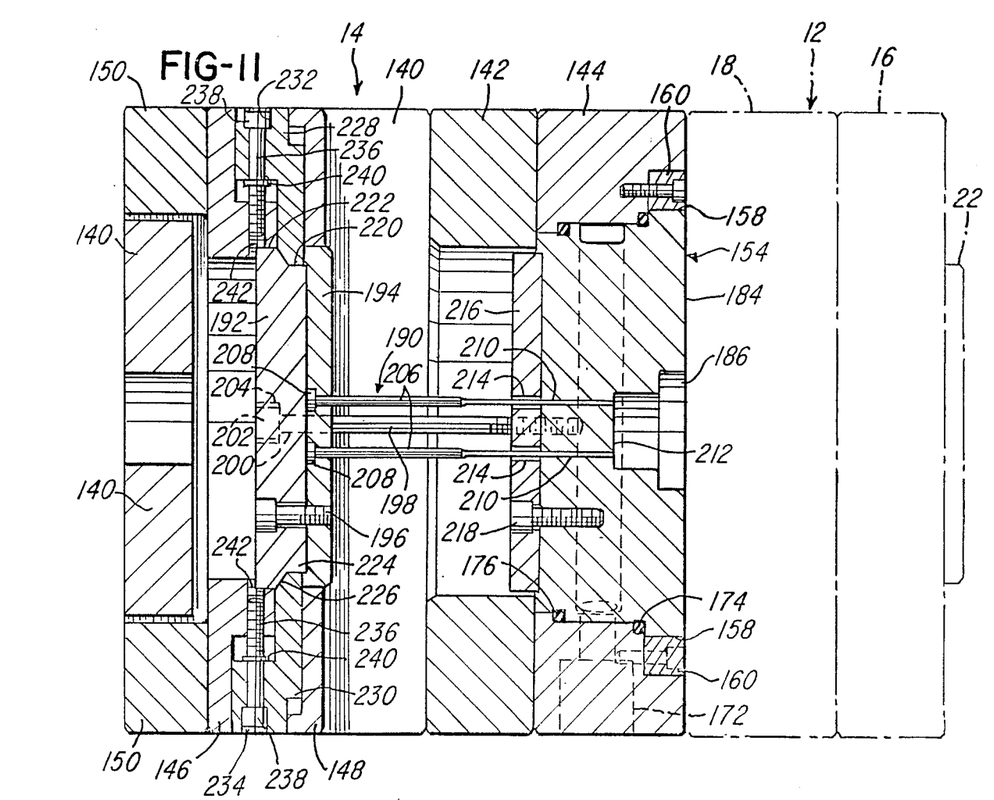

With reference to FIG. 1, this invention is directed to mold apparatus comprising a master frame, generally designated 10, comprising a first, injection side, generally designated 12, and a second, ejection side, generally designated 14. As shown in FIG. 11, the face of the injection side 12 abuts against the face of the ejection side 14 when a molding operation takes place. The master frame 10 has an external configuration common to many master frames in current use so that it is readily usable with a conventional injection molding machine (not shown) The manner in which the master frame 10 is supported by the molding machine may be entirely conventional and therefore is not described herein. It is to be understood that the external configuration of the master frame 10 can be constructed as needed to accommodate the machine with which it is to be used.

With reference to FIGS. 1–4, the injection frame part 12 comprises a generally rectangular top clamp plate 16 abutted against the rear face of a first mold or "A" plate 18. Plates 16 and 18 are bolted together in conventional fashion. Four leader pins 20 having enlarged heads 20A (FIG. 4) trapped between the plates 16 and 18 project from the respective four corners of the face of the "A" plate 18. With continued reference to FIG. 4, a conventional locating ring 22 and a conventional sprue bushing plate 24 are bolted to the top clamp plate 16. Ring 22 and plate 24 are so constructed to interfit properly with cooperating parts of the molding machine with which they are used.

In accordance with the present invention and with reference again to FIGS. 1–4, the injection frame part 12 further comprises a generally cylindrical, cavity insert 26 retained within a generally circular, centrally located, cavity insert-receiving bore or hole 28 in the "A" plate 18. Cavity insert 26 is centered on the center, longitudinally extending axis of the master frame 10 and has a gate 30 opening from a sprue 32 to its exposed face 34.

Cavity insert 26 comprises a solid, one-piece metal body which is stepped along its length to comprise three disc-shaped, longitudinally-adjacent sections, namely a first, largest diameter, locking section 36, a second, intermediate diameter, section 40. The first section 36 extends from the insert face 34 to a shoulder 42 (FIG. 6) parallel to the face 34 and has diametrically-opposed flats 44 and 46 and a pair of circumferentially-extending locking grooves 48 and 50. Locking groove 48 is uppermost and extends from the top of flat 44 to the top of flat 46, whereas locking groove 50 is lowermost and extends from the bottom of flat 44 to the bottom of flat 46.

When the insert 26 is assembled in the "A" plate 18, the shoulder 42 rests upon a confronting shoulder 52 formed within the bore 28. The proper rotary orientation of the insert 26 within the bore 28 is accurately established by a rectangular key 54 that abuts the flat 44 and a rectangular key 56 that abuts the flat 46, the keys 54 and 56 being located in accommodating, generally rectangular recesses 58 and 60, respectively, within the "A" plate 18 and retained therein by screws 62. Further to ensure the proper orientation of the insert 26, a locating key 64 (FIGS. 2 and 5) projects from the middle top part of the "A" plate shoulder 52, into a notch 66 (see FIG. 2) in the middle top of the insert 26 extending from the upper locking groove 48 to the insert shoulder 42.

Four insert retainer and lifter assemblies, generally designated 70, are located around the outer circumference of the cavity insert 26 and are adapted to clampingly retain the cavity insert 26 in the bore 28 of the "A" plate 18 and further, to lift or jack the cavity insert 26 out of the bore 28 to initiate removal of the insert 26 from the "A" plate 18. Four circumferentially-spaced arcuate bores, respectively designated 72A, 72B, 72C, and 72D, each of which receives one of the retainer and lifter insert assemblies 70, open to the bore 28 and extend through the "A" plate 18, The arcuate bores are so located that two of the retainer and lifter assemblies 70 are positioned adjacent portions of the locking grooves 48 and 50 on one side of the "A" plate 18 and two adjacent the other side. The bores 72A and 72C are mutually diametrically opposed as are the bores 72B and 72D. For reasons which will become apparent, four tapped holes 74, only one being shown in FIG. 6, extend through the top clamp plate 16 in alignment with respective ones of the arcuate bores 72A, 72B, 72C, and 72D. Each tapped hole 74 has an aligned counterbore 76 located in the face of the top clamp plate 16 abutting the "A" plate 18.

As shown in FIGS. 2 and 6–9, each retainer and lifter assembly 70 comprises a generally cylindrical retaining and lifting element, generally designated 80, having a through bore 82, and a counterbore 84 at one end thereof, the bore 82 and the counterbore 84 being adapted to receive the shank 86 and the enlarged head portion 88, respectively, of a threaded clamp screw 90, which is adapted to be threadedly engaged into the tapped hole 74 in the top clamp plate 16. The clamp screw 90 and the retaining and lifting element 80 are held in mutually assembled relation by the screw head 88 and a pair of jam nuts 92 such that the retaining and lifting element 80 is rotatable about the axis of the clamp screw 90 and substantially confined for axial movement therewith.

With continued reference to FIGS. 2 and 6–9, each retaining and lifting element 80 has a slot 94 extending part way around the counterbore 84 defining an arcuately extending clamping tongue 96 at the exposed end of the retaining and lifting element 80 which is adapted to enter one of the locking grooves 48 and 50. In addition, the exposed face of the element 80 is notched as indicated at 98, so that one may insert a screwdriver therein and rotate the element 80 relative to its associated screw 90 about the axis of the tapped hole 74 so as to move the tongue 96 into and out of its associated locking groove 48 or 50. The same end of the element 80 is provided with a flat 100 terminating at a shoulder 102 which is coplanar with base of the slot 94.

Figures 3, 4, 5, 6, 7, 8, 9:
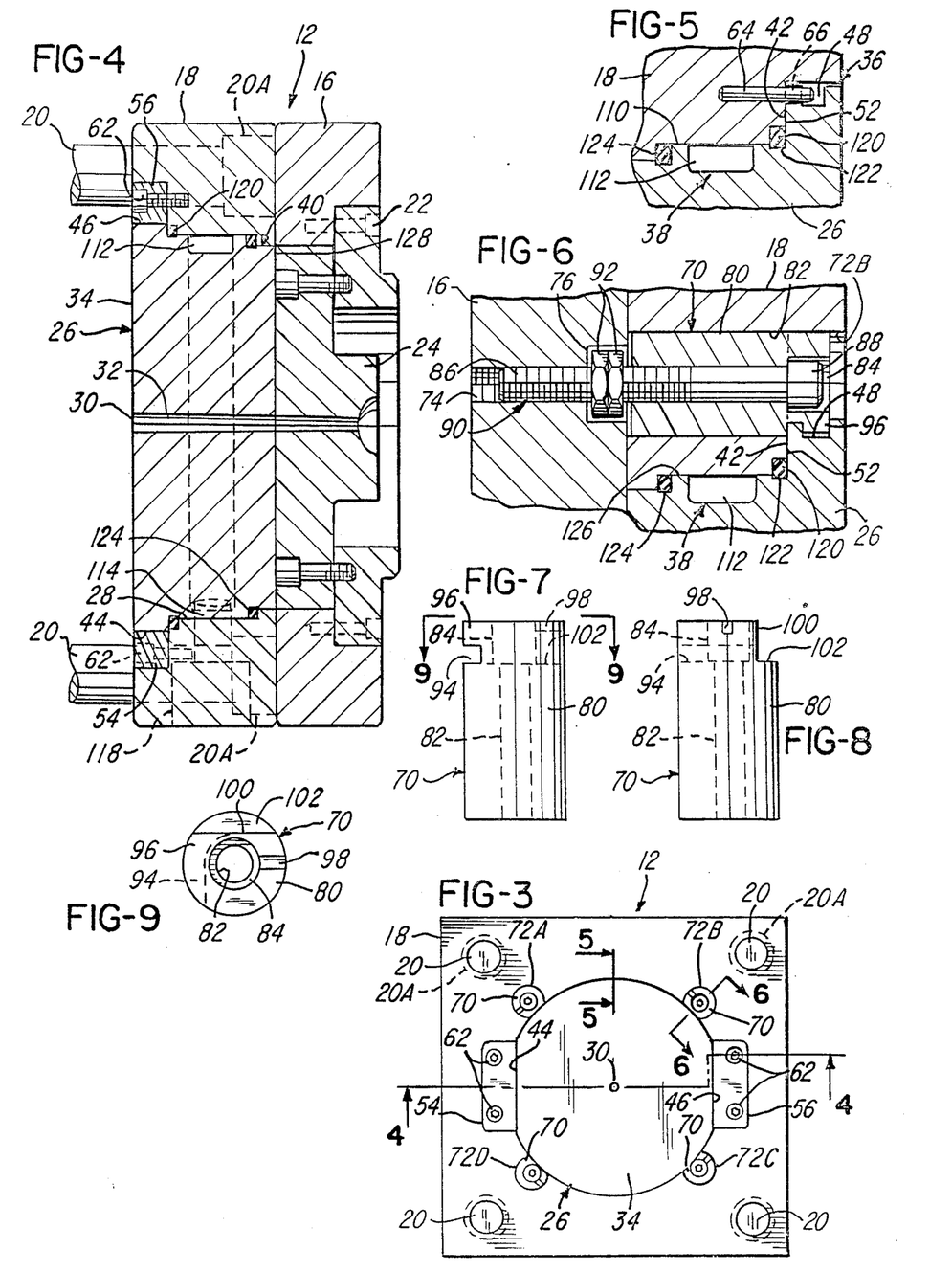
FIG. 3 is a front elevational view of the injection side.
FIG. 4 is a cross sectional view of the injection side taken along section line 4—4 of FIG. 3. The section has been rotated through 90 degrees.
FIG. 5 is an enlarged, fragmentary, cross-sectional view taken along section line 5—5 of FIG. 3 of a portion of the injection side and particularly illustrating a locating key and notch.
FIG. 6 is an enlarged, fragmentary, cross sectional view taken along section line 6—6 of FIG. 3 of a portion of the injection side and particularly illustrating an insert retainer and lifting assembly.
FIG. 7 is an elevational view of an insert retainer and lifter element forming part of the insert retainer and lifting assembly of FIG. 6.
FIG. 8 is an elevational view of the insert retainer and lifter element as viewed from the right side of FIG. 7.
FIG. 9 is a top plan view of the lifter element of FIG. 7 as indicated by the arrows 9—9 thereof.

The shoulder 102 is spaced by substantially 90 degrees from the slot 94 so that one may, by inserting the tip of a screwdriver into the notch 98, rotate the element 80 so as to cause the tongue 96 to enter one of the locking grooves 48 or 50. One may then tighten the screw 90 so as to draw the cavity insert 26 tightly against the top clamp plate 16 and the insert shoulder 42 tightly against the "A" plate shoulder 52. On the other hand, one may, upon loosening the screw 90, again engage in the notch 98 by the tip of a screwdriver, and rotate the element 80 so that the tongue 96 is removed from its associated locking groove 48 or 50 and bring the shoulder 102 of the element 80 into alignment with the insert shoulder 42. Then, by rotating the screw 90 to partly retract the screw 90 from the tapped hole 74, whereupon the jam nuts 92 engage the backface of the element 80, one may cause the shoulder 102 of the element 80 to move the cavity insert 26 out of the bore 28 in the "A" plate 18.

In practice, to initiate the removal of the cavity insert 26, one would loosen all four of the screws 90 and rotate the elements 80 to remove the clamping tongues 96 from the locking grooves 48 and 50. One would then partly unscrew two diametrically opposed screws 90 in order to draw the cavity insert 26 an inch or so out of the insert-receiving bore 28. This results because the jam nuts 92, being carried by the screws 90 engage the rear face of their respective elements 80, whereupon the shoulders 102 of the latter push against the insert shoulder 42. Thereafter, one may grasp the exposed part of the insert 26 by hand and completely remove it. A replacement insert (not shown) may be assembled in the bore 28 simply by bringing the elements 80 to a uniform level so that all of the clamping tongues 96 may engage in the clamping grooves of the replacement cavity insert, sliding the replacement cavity insert into the cavity-receiving bore 28, rotating the elements 80 so that their clamping tongues 96 enter the clamping grooves 48 and 50, and then screwing the screws 90 deeper into the tapped holes 74 to secure the replacement cavity insert.

From the foregoing description, it is seen that this invention provides a simple yet reliable mechanism for quickly changing from one cavity insert to another. At all times the inserts are securely under the control of the person using the equipment so that damage to the inserts or other parts of the molding machine should not occur during changeover.

Referring again to FIGS. 2 and 4, the intermediate diameter or liquid channel section 38 of the cavity insert 26 has a circular outer surface 110 of uniform diameter except for a centrally located liquid conduit groove 112 that extends approximately 340 degrees therearound, the adjacent ends of which are separated by a barrier section 114. Groove 112 forms a conduit for water or other liquid that may be used for heating or cooling of the cavity insert 26. To this end, the barrier 114 is located at the 3:00 o'clock position when viewing the injection side from its face as in FIG. 3, and the "A" plate 18 is provided with a liquid inlet connector 116 and a liquid outlet connector 118 at approximately the 3:00 o'clock position that communicate directly with opposite ends of the liquid conduit groove 112. As will be apparent to those familiar with the art, suitable liquid supply lines, which are not shown but are commonly used, will be connected to the inlet 116 and the outlet 118 for circulating cooling or heating liquid, usually water, around the cavity insert 26.

To insure that there is no leakage of liquid from the center section 38, a first, larger diameter, 0-ring sealing member 120, which bears against the insert shoulder 42, encircles the intermediate section 38 and is located within a hollow annular ring 22 machined in the insert 26 and the insert-receiving bore 28 for this purpose. Further, a second, smaller diameter O-ring sealing member 124 encircles the smallest diameter section 40 of the cavity insert 26 and bears against a shoulder 126 formed on the intermediate insert section 38 adjacent and radially outwardly extending from the smallest diameter insert section 40.

The base surface, designated 128, of the smallest diameter insert section 40 bears against the confronting face of the sprue bushing plate 24, and is clamped thereto by the retainer and lifter assemblies 70 as described above.

It is thus seen that the task of designing and machining of heating or cooling lines and the need for providing seals, as usually required when making molds, may be avoided by the practice of this invention.

Another advantage of the construction of the cavity side 12 is that not only the cavity insert 26 but also the sprue bushing plate 24 may be removed from the face side of the "A" plate 18 without removing the injection side of the master mold from the molding machine. Accordingly, much time may be saved when changing sprue bushing types, such as to extended nozzle bushing pates, or when changing, for example, to hot sprue bushings or to runnerless manifolds.

Figures 10, 12, 13, 14:
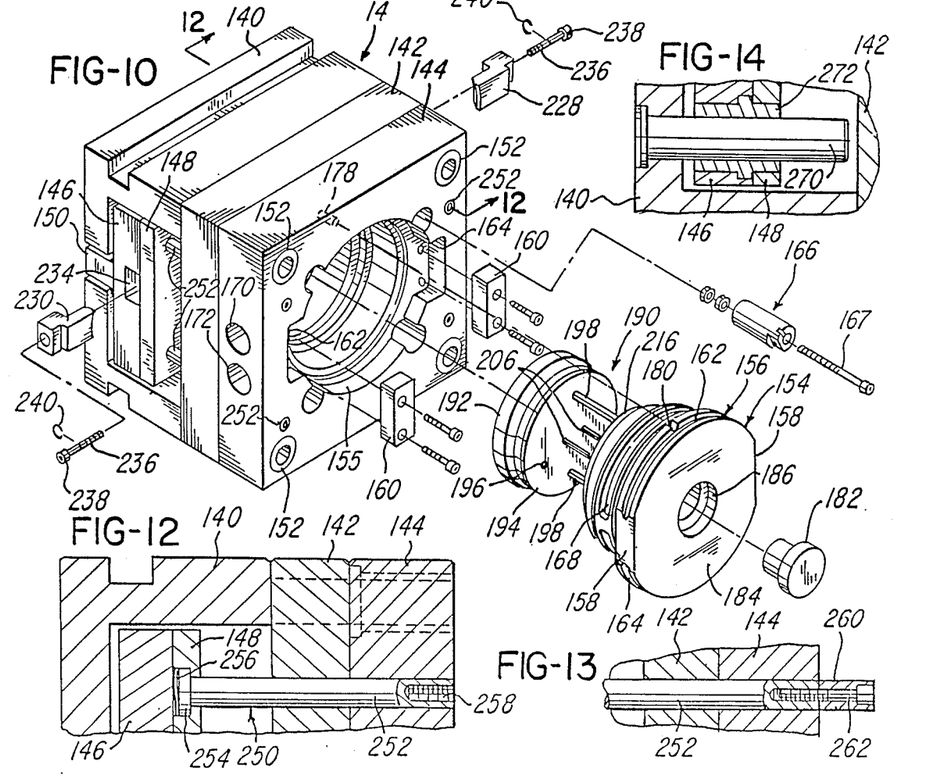
FIG. 10 is a partially-exploded perspective view of the ejection side of FIG. 1 and a piece part molded thereby.
FIG. 12 is a fragmentary cross sectional view of a portion of the ejection side taken on section line 12—12 of FIG. 10.
FIG. 13 is a fragmentary cross sectional view similar to FIG. 12 showing a modification.
FIG. 14 is a fragmentary cross sectional view of another portion of the ejection side.

Turning now to FIGS. 1, 10, and 11, the ejector side 14 comprises a U frame 140, a support plate 142, a "B" plate 144, main frame ejector plates 146 and 148, and ejector extension blocks 150. Alignment bushings 152 at the corners of the "B" plate 144 are provided to receive the leader pins 20. The construction and operation of the above ejector side parts will be apparent to those familiar with the art. Except for features described below, these parts are conventional and further discussion thereof is deemed unnecessary.

In this case, the "B" plate 144 is provided with a core insert 154, which is adapted to be clamped into a core insert-receiving bore or hole 155 in the "B" plate 144, and which is identical to the cavity insert 26 except for differences required to accommodate the ejector mechanism and by the construction of the part to be molded. Core insert 154 accordingly comprises a stepped, cylindrical body member, having a larger diameter locking section 156 with flats 158 which cooperate with rectangular keys 160 which are identical to the keys 54 and 56 described above Locking section 156 also has upper and lower locking grooves 162 and 164 that correspond fully to the locking grooves 48 and 50 of the cavity insert 26. Four insert retainer and lifting assemblies 166 are used to clamp the core insert to the "B" plate 144, the assemblies 166 being identical to the previously described assemblies 70, and having clamp screws 167 that are threadedly received in tapped hoes (not shown) in the support plate 142. Likewise, the core insert 154 has a liquid channel section 168 to which liquid is supplied by connectors 170 and 172, and which is jacketed by O-ring sealing members 174 and 176, again the same as in the case of the cavity insert 26. A pin 178 on the "B" plate 144 and a notch 180 in the core insert 154 assure proper alignment between the core insert 154 and the "B" plate 144.

With respect to the part to be molded, a simple example is designated 182 in FIG. 10, for which the face, designated 184, of the core insert 154 has a cavity 186 conforming to the shape of the top and sidewalls of the piecepart 182, its bottom being shaped by the face 34 of the cavity insert 26. To eject the piecepart 182 from the cavity 186, the core insert 154 ejector tooling, generally designated 190, is connected in axial alignment with the core insert 154. Ejector tooling 190 comprises a pair of ejector tooling plates, namely a rearward tooling plate 192 and a forward tooling plate 194 secured in face-to-face relationship to one another as by screws 196 (only one of which is shown in FIG. 11). The ejector tooling 190 is preferably connected to the core insert 154 so that it will be retained with the core insert 154 when the core insert 154 is inserted or removed from the main frame. For this purpose, the ejector tooling plates 192 and 194 are slidably mounted on a pair of retainer screws 198 which are threadedly engaged in tapped holes in the rear of the core insert 154. Retainer screws 198 are slidably received in bores 200 in the ejector tooling plates 19 and 194 and have larger diameter heads 202 located in counterbores 204 in the rear face of the rearward plate 192. Because the ejector tooling plates 192 and 194 are freely slidable relative to the retainer screws 198, the retainer screws do not interfere with the operation of the ejector assembly 190, but are effective to retain the ejector tooling 190 with the insert 154 when it is removed from the main frame tooling.

A pair of ejector pins 206 having heads 208 trapped between the ejector tooling plates 192 and 194 extend through bores 210 in the core insert 154 to the base surface, designated 212, of the cavity 186. The ejector pins may be received in bores 214 in a core pin-retainer plate 216 that may be optionally mounted on the rear face of the core insert 154 as by bolts 28. As those familiar with the art will be aware, plate 216 is used to retain core pins (not shown) when such are used.

Of course, it should be understood that the ejector pin arrangement shown in the drawings is merely exemplary of many ejector arrangements that may be employed in the practice of this invention and that the arrangement selected will depend upon the demands of the pieceparts to be produced and the preferences of the mold maker Those familiar with the art will recognize that sleeve-type ejectors could be used by adding two more plates. Support pillars may be added if the mold maker should desire.

As shown in FIG. 11, the ejector tooling plates 192 and 194 are located within centrally located bores 220 and 222, respectively, in the master frame ejector plates 146 and 148. The outer surface of the rearward tooling plate 146 has a reduced diameter forward section 224 and a rearwardly and outwardly sloping intermediate section 226. These surfaces 224 and 226 are adapted to be clampingly engaged by a pair of wedge-shaped ejector clamps 228 and 230 slidably mounted in transversely extending guideways 232 and 234 formed in the sides of the master frame ejector plates 146 and 148. Each ejector clamp 228 and 230 has an associated clamping screw 236 affixed thereto as by the enlarged head, designated 238, thereof and a snap ring 240. The clamping screws 236 are threadedly engaged in tapped holes 242 in the ejector plate 146.

The ejector side is prepared to mold the piecepart 182 by positioning the core insert 154 and its associated ejector tooling into the ejector frame assembly. The retainer and lifter assemblies 166 are tightened down, just as in the case of the retainer and lifter assemblies 70, to draw the core insert 154 into the "B" plate 144 and clamp it thereto. The transversely slidable ejector clamp is then tightened so as to secure the ejector tooling plates 192 and 194 to the master frame ejector plates 146 and 148. Removal of the core insert and ejector tooling may be accomplished by first withdrawing the ejector clamps 228 and 230 from clamping engagement with the ejector tooling plates 192 and 196 by unscrewing the clamp screws 236. The core insert 154 may then be jacked out of the "B" plate 144 by operation of the retainer and lifter assemblies 166 in exactly the same manner as the cavity insert 26 is jacked out of the "A" plate 18 by the retainer and lifter assemblies 70.

Some mold makers may prefer not to connect the core insert 154 to the ejector tooling 190 by the retainer screws 198. In such event, of course, the ejector tooling 190 may be installed and removed separately from the core insert 154.

It may be noted that all of the screws used to tighten or loosen the retainer and lifter assemblies 70 and 166 and the ejector clamps 236 and 238 have conveniently accessible socket heads so that a skilled workman may completely change over from the molding of one piecepart to another in a matter of a few minutes. It may also be noted that the machining of inserts is vastly simplified in contrast to usual practice because the basic shape of the inserts is retained from piecepart to piecepart, only the shapes of the cores and cavities needing to be custom machined.

The return of the ejector assembly 190 in preparation for each subsequent molding operation may be assured, as is conventional, by the use of ejector return pins connected to the main frame ejector plates 146 and 148. In operation, the face of the "A" plate engages the ends of the ejector return pins as the mold begins to close in preparation for each molding operation, thus forcing the return of the ejector mechanism. Preferably, an improved return pin assembly, generally designated 250, and illustrated in FIG. 12, is employed with the cavity and core inserts of this invention. The assembly 250 includes four return pins 252 (see FIG. 1), one of which is shown in FIG. 12. The pin 252 has an enlarged head 254 trapped between the main frame ejector plates 146 and 148 in a recess provided therefore. A spring disk or washer 256 is located in the recess between the return pin head 254 and the rearward ejector plate 146. The spring disk or washer 256 biases the ejector pin 252 outwardly past the face of the "B" plate 144, preferably by approximately 0.020 inch. Accordingly, it is possible to form each insert 26 and 154 with an oversized thickness so that they project beyond the planes of the faces of the "A" plate 18 and "B" plate 144, respectively, by as much as 0.010 inch. This enables the mold manufacturer to machine the inserts so that a few thousandths of an inch may be machined off after the machined surfaces of the inserts have become worn through use.

The face ends of the ejector return pins 252 are preferably provided with tapped, axially extending holes 258 so that the ejector return pins 252 may be modified, as illustrated in FIG. 13, to include axially extending extension sleeves 260 held thereto by socket head screws 262. Thus, the mold maker may machine inserts which are quite oversized so that the "A" plate and the "B" plate are mutually spaced by as much as an inch or more during each molding operation. In such case, the face of the "B" plate will engage the free end of the return pin extensions to assure return of the ejector mechanism.

The practice of this invention enables the use of a guided ejection system as part of the main mold frame. Referring to FIG. 14, a pair of guide pins 270, only one being shown, are press fit at a suitable location in the U-frame 140 and slidably received by a guide bushing 272 clamped to the main frame ejector plates 146 and 148 to provide a positive guide for the ejector mechanism. Therefore, it is unnecessary to provide a guide means for each core insert ejector tooling assembly.

Although the preferred embodiment of this invention has been described, it will be apparent that various modifications may be made within the purview of the following claims.

I claim:

1. A quick-changeover mold insert for use in an injection molding machine, said machine having a pair of relatively movable mold sides forming a mold cavity therebetween, said mold sides being separable to expose confronting parts of said mold sides, one of said mold sides comprising a mold plate having a surface confronting the other mold side which surface is exposed when said mold sides are separated, said mold plate having an insert-receiving hole adapted to receive a mold insert, and said machine having insert retainer and lifter means on said mold plate for clamping said mold insert to said mold plate and for lifting said mold insert partly out of said insert-receiving hole, said mold insert comprising:

a generally cylindrical, one-piece body stepped along its length, said body comprising longitudinally-adjacent sections of different diameters including a first diameter locking groove section having an outer peripheral surface, an end face, and locking means forming locking groove segments at portions of said outer peripheral surface, said locking groove segments being engageable by said insert retainer and lifter means for clamping said mold insert to said mold plate with said end face confronting the other mold side and also for partly removing said mold insert from said mold plate, and said sections further comprising a second diameter liquid channel section, said liquid channel section having a liquid channel groove extending substantially completely therearound, said liquid channel section being smaller in diameter than said locking groove section, and a pair of axially spaced O-ring seal-receiving groove means for partly receiving O-rings located on opposite sides of said liquid channel groove.

2. The mold insert of claim 1 wherein said locking groove section has locating means for orienting said mold insert relative to said mold plate.

3. The mold insert of claim 2 wherein said locating means comprises at least one flat on said outer peripheral surface of said locking groove section.

4. The mold insert of claim 1 wherein said liquid channel groove has a first end and a second end spaced from said first end and wherein said liquid channel groove is interrupted by a barrier adjacent each of said first groove end and said second groove end.

5. The mold insert of claim 1 wherein said sections further include a third diameter section, said third diameter section being smaller in diameter than said liquid channel section.

6. The mold insert of claim 5 wherein one of said seal-receiving groove means is located on said liquid channel section immediately adjacent said locking groove section and the other of said seal-receiving groove means is located on said third diameter section immediately adjacent said liquid channel section.

7. A quick-changeover mold insert for use in an injection molding machine, said machine having a pair of relatively movable mold sides forming a mold cavity therebetween, said mold sides being separable to expose confronting parts of said mold sides, one of said mold sides comprising a mold plate having a surface confronting the other mold side which surface is exposed when said mold sides are separated, said mold plate having an insert-receiving hole adapted to receive a mold insert, and said machine having insert retainer and lifter means on said mold plate for clamping a mold insert to said mold plate and for lifting said mold insert partly out of said insert-receiving hole, said mold insert comprising:

a generally cylindrical, one-piece body stepped along its length, said body comprising longitudinally-adjacent sections of different diameters including a first diameter locking groove section having an outer peripheral surface, an end face, and locking means forming locking groove segments at portions of said outer peripheral surface, said locking groove segments being engageable by said insert retainer and lifter means for clamping said mold insert to said mold plate with said end face confronting the other mold side and also for partly removing said mold insert from said mold plate, and said sections further comprising a second diameter liquid channel section, said liquid channel section having a liquid channel groove extending substantially completely therearound, said liquid channel section being smaller in diameter than said locking groove section, and a pair of axially spaced O-ring seal-receiving groove means for partly receiving O-rings located on opposite sides of said liquid channel groove;

an ejector tooling assembly; and means for retaining said ejector tooling assembly with said body.

8. The mold insert of claim 7 wherein said sections further include a third diameter section, said third diameter section being smaller in diameter than said liquid channel section.

9. The mold insert of claim 8 wherein one of said seal-receiving groove means is located on said liquid channel section immediately adjacent said locking groove section and the other of said seal-receiving groove means is located on said third diameter section immediately adjacent said liquid channel section.

10. A quick-changeover mold insert for use in an injection molding machine, said machine having a pair of relatively movable mold sides forming a mold cavity therebetween, said mold sides being separable to expose confronting parts of said mold sides, one of said mold sides comprising a mold plate having a surface confronting the other mold side which surface is exposed when said mold sides are separated, said mold plate having an insert-receiving hole adapted to receive a mold insert, and said machine having insert retainer and lifter means on said mold plate for clamping said mold insert to said mold plate and for lifting said mold insert partly out of said insert-receiving hole, said mold insert comprising:

a one-piece body comprising a locking groove section having a generally cylindrical outer peripheral surface and an end face and said locking groove mechanism having locking means forming locking groove segments at portions of said outer peripheral surface, said locking groove segments being engageable by said insert retainer and lifter means for clamping said mold insert to said mold plate with said end face confronting the other mold side and also for partly removing said mold insert from said mold plate.

11. The mold insert of claim 10 wherein said locking groove section has locating means for orienting said mold insert relative to said mold plate.

12. The mold insert of claim 11 wherein said locking groove section has a generally cylindrical outer surface and said locating means comprises at least one flat on said outer surface of said locking groove section.

13. A quick-changeover mold insert use in an injection molding machine having a pair of relatively movable mold sides forming a mold cavity therebetween, said mold sides being separable to expose confronting parts of said mold sides, one of said mold sides comprising a mold plate having a surface confronting the other mold side which surface is exposed when said mold sides are separated, said mold plate having an insert-receiving hole adapted to receive a mold insert, and said machine having insert retainer and lifter means on said mold plate for clamping a mold insert to said mold plate and for lifting said mold insert partly out of said insert-receiving hole, said mold insert comprising:

a one-piece body comprising a locking groove section having a generally cylindrical outer peripheral surface and an end face, said locking groove section having locking means forming locking groove segments at portions of said outer peripheral surface of said locking groove section, said locking groove segments being engageable by said insert retainer and lifter means for clamping said mold insert to said mold plate with said end face confronting the other mold side and also for partly removing said mold insert from said mold plate;

an ejector tooling assembly; and means for retaining said ejector tooling assembly with said body.

14. The mold insert of claim 13 wherein said locking groove section has locating means for orienting said mold insert relative to said mold plate.

15. The mold insert of claim 14 wherein said locating means comprises at least one flat on said outer peripheral surface of said locking groove section.

* * * * *

UNITED STATES PATENT AND TRADEMARK OFFICE
CERTIFICATE OF CORRECTION

PATENT NO. : 4,959,002  
DATED : May 8, 1989  
INVENTOR(S) : Ronald E. Pleasant

Page 1 of 2

It is certified that error appears in the above-identified patent and that said Letters Patent is hereby corrected as shown below:

Column 1, line 34, "screWs" should be --screws--.
Column 2, line 23, "cross sectional" should be --cross-sectional--; column 2, line 55, "pate" should be --plate--.
Column 3, line 8, "shown)" should be --shown).--; column 3, line 24, "so" should be --also--; column 3, line 40, "diameter," should be --diameter, liquid channel section 38, and a third, smallest diameter, base--.
Column 4, line 5, "18," should be "18."
Column 5, line 52, "22" should be --122--.
Column 6, line 11, "U frame" should be --U-frame--; column 6, line 30, "above" should be --above.--; column 6, line 67, "19" should be --192--.
Column 7, line 13, "28" should be --218--; column 7, line 22, "maker" should be --maker.--.

UNITED STATES PATENT AND TRADEMARK OFFICE
CERTIFICATE OF CORRECTION

PATENT NO.  : 4,959,002

DATED       : May 8, 1989

INVENTOR(S) : Ronald E. Pleasant

It is certified that error appears in the above-identified patent and that said Letters Patent is hereby corrected as shown below:

Column 10, claim 10, line 46, "mechanism" should be --section--.
          claim 13, line 61, "use" should be --for use--.

Signed and Sealed this

Fifth Day of May, 1992

Attest:

DOUGLAS B. COMER

*Attesting Officer*    *Acting Commissioner of Patents and Trademarks*